United States Patent [19]
Hikita et al.

[11] Patent Number: 5,841,266
[45] Date of Patent: Nov. 24, 1998

[54] POWER SOURCE SYSTEM FOR A VEHICLE

[75] Inventors: Sakae Hikita; Yoshiaki Honda, both of Hitachinaka; Masakatsu Fujishita, Mito; Sakae Ishida, Hitachinaka; Syouju Masumoto, Hitachiohta; Naoyuki Takahashi, Hitachinaka, all of Japan

[73] Assignees: Hitachi Ltd., Tokyo; Hitachi Car Engineering Co., Ltd., Hitachinaka, both of Japan

[21] Appl. No.: 584,395

[22] Filed: Jan. 11, 1996

[30] Foreign Application Priority Data

Jan. 10, 1995 [JP] Japan ................................. 7-001707
Jun. 29, 1995 [JP] Japan ................................. 7-163303

[51] Int. Cl.$^6$ ....................................................... H02J 1/00
[52] U.S. Cl. ............................... 322/8; 322/33; 307/10.1; 318/139
[58] Field of Search .................................. 322/33, 25, 28; 320/6

[56] References Cited

U.S. PATENT DOCUMENTS

| | | | |
|---|---|---|---|
| 4,739,245 | 4/1988 | Komurasaki et al. | 322/99 |
| 5,187,350 | 2/1993 | Tsuchiya | 219/203 |
| 5,321,231 | 6/1994 | Schmalzriedt et al. | 219/497 |
| 5,355,071 | 10/1994 | Ishida et al. | 320/6 |
| 5,389,825 | 2/1995 | Ishikawa et al. | 307/10.1 |
| 5,390,493 | 2/1995 | Fujishita et al. | 60/284 |
| 5,512,789 | 4/1996 | Lyon | 307/10.1 |
| 5,539,286 | 7/1996 | Brinkmeyer et al. | 318/139 |

FOREIGN PATENT DOCUMENTS

| | | |
|---|---|---|
| 0 390 698 | 10/1990 | European Pat. Off. . |
| 0 402 040 | 12/1990 | European Pat. Off. . |
| 0 407 633 | 1/1991 | European Pat. Off. . |
| 0 407 641 | 1/1991 | European Pat. Off. . |
| 0 703 653 | 3/1996 | European Pat. Off. . |
| 61-33735 | 4/1986 | Japan . |

*Primary Examiner*—Steven L. Stephan
*Assistant Examiner*—Nicholas Ponomarenko
*Attorney, Agent, or Firm*—Evenson, McKeown, Edwards & Lenahan, PLLC

[57] ABSTRACT

A power source system for a vehecle is disclosed. The system has a generator driven by an internal combustion engine, a control equipment for controlling the generator, a battery, a heater which is heated by the generated output of the temperature detecting means for detecting generator, and a temperature of the heater. The system has a switch between the heater and between the generator and the generator and the battery. The heater and the battery are connected in parallel to each other.

6 Claims, 12 Drawing Sheets

Fig.4
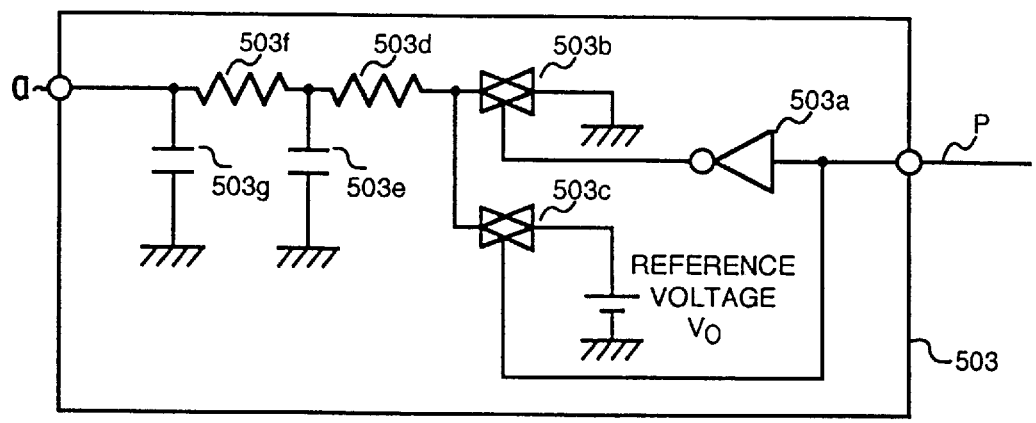
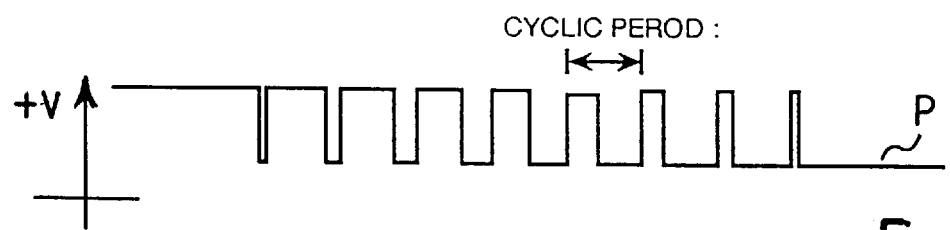
Fig. 5A
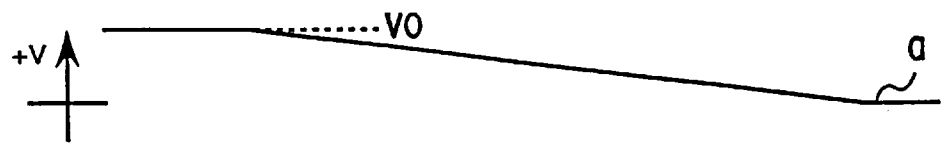
Fig. 5B

POWER SOURCE SYSTEM FOR A VEHICLE

BACKGROUND OF THE INVENTION

The present invention relates to a power source system on board a vehicle, and more particularly to a power source system having an electrically heating catalyst system.

As a conventional power source system for a vehicle, the Japanese Patent Publication No. 61-33735 discloses an example in which a rotating-field type generator supplies about 60 volts to a window heating circuit for the vehicle, in addition that it does 14 volts a little higher than the terminal voltage of a battery to normal electrical load.

If certain trouble occurs while low voltage is generated, a field current may go out of control. As a result, more than 17 volts can occur, and therefor, the battery may break. In order to prevent such an accident, there is generally provided an overvoltage alarm circuit for informing users of the occurrence of the accident in a recent generator. When an electrically-heated catalyst (hereinafter, referred to as an EHC system) is used, it is required to generate high voltages of more than 17 volts in order to heat the EHC system. Therefore, the alarm circuit may issue an erroneous alarm when the EHC system is heated.

SUMMARY OF THE INVENTION

An object of the present invention is to provide a power source system for a vehicle in which an alarm circuit does not operate unexpectedly and a battery does not fail, when an EHC system is used.

According to one aspect of the present invention, a power source system for a vehicle includes a generator driven by an internal combustion engine to generate electric power, a control equipment for controlling the generator, a battery which is charged by a generated output of the generator, a heater which is heated by the generated output of the generator, and a temperature detector for detecting the temperature of the heater. In addition, a switch is provided between the generator, and the heater and the battery which are connected in parallel to each other.

In a charging system having a generator which is driven by an internal combustion engine, a group of electrical loads and a battery which is charged by the generator, and a changeover switch for connecting the generator to an EHC system, or it to the battery, etc. are provided. First, the change-over switch is connected to the battery, and then the internal combustion engine is started by a starter. The generator decreases its generated output at the same time when the engine speed reaches a predetermined speed. The generated output of the generator is held at a certain voltage setting during a predetermined period of time. After that, the generator gradually increases its generated output at the same time as when the change-over switch is connected to the EHC system. The generated output is increased until it reaches a voltage setting which effectively heats the EHC system, for example, 30 volts. In addition, the engine speed is also maintained at a certain setting during a predetermined period of time. Here, the function of maintaining the voltage at a constant value and the function of preventing a malfunction of an overvoltage alarm circuit are incorporated in a generation control equipment. After holding the generated output at a constant value during the predetermined period of time, the generated output of the generator is decreased and held at a certain voltage setting during a certain predetermined period of time.

BRIEF DESCRIPTION OF THE DRAWINGS

In the drawings, like reference characters denote like parts in the various views.

FIG. 4 is a schematic diagram of a voltage converting circuit.

FIG. 5 is a waveform diagram illustrating the operation of the voltage converting circuit shown in FIG. 4.

THE PREFERRED EMBODIMENTS OF THE PRESENT INVENTION

A power source system for a vehicle according to one embodiment of the present invention will be explained hereinafter with reference to the attached drawings.

Figure 1:
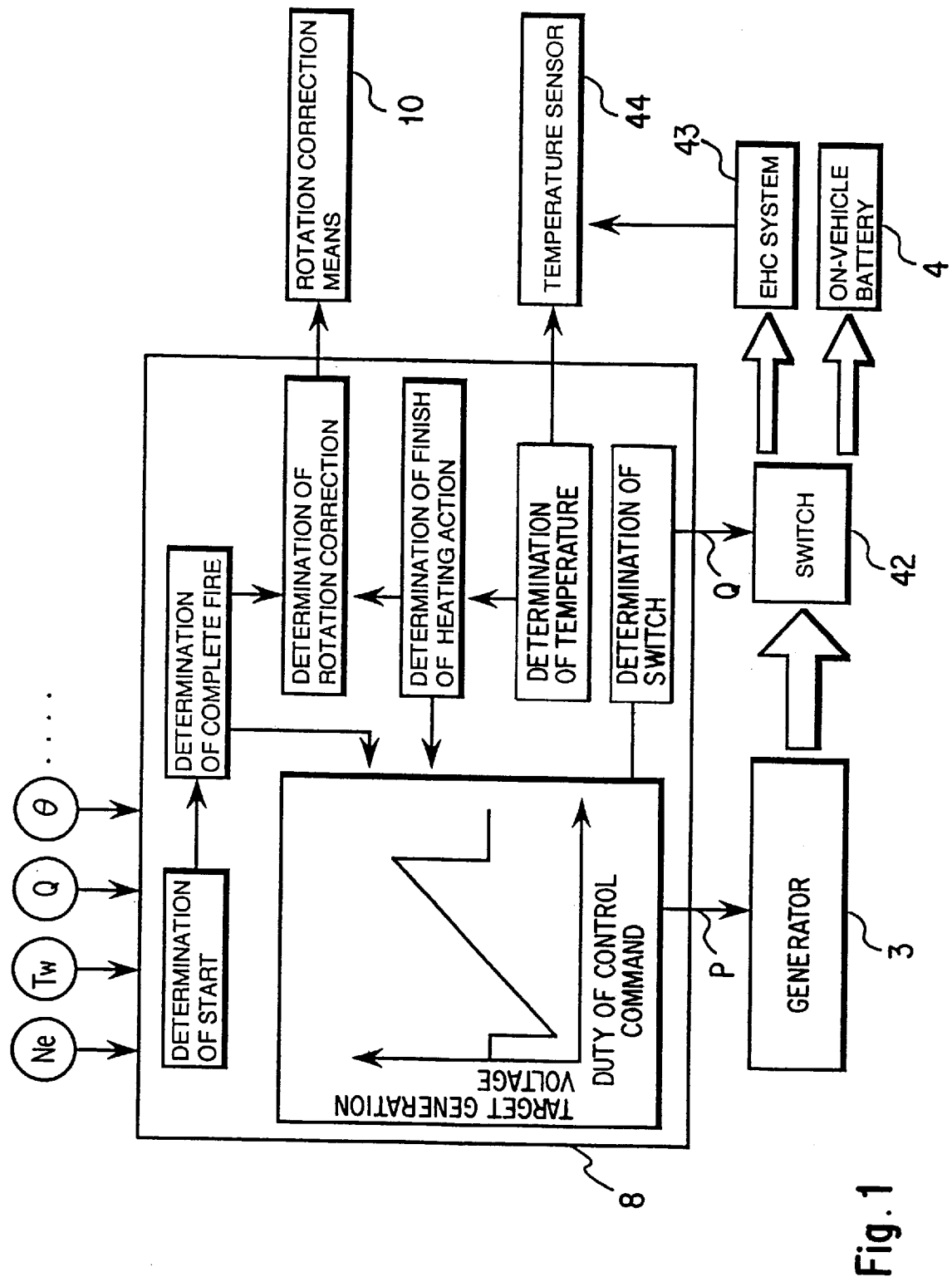
FIG. 1 is a block diagram showing the function of a power source system for a vehicle according to the present invention.

FIG. 1 is a block diagram showing the function of a power source system for a vehicle according to the present invention. In FIG. 1, reference numeral 8 designates an engine control unit (hereinafter, referred to as an ECU) which is a control unit for an internal combustion engine located on board a vehicle. The ECU 8 inputs parameters of the internal combustion engine such as engine speed, engine water temperature, throttle opening, engine intake air amount, etc. Then, using those parameters, the ECU determines whether or not the internal combustion engine is started, and whether or not the engine fires completely after confirming the normal start of the engine. The complete fire can be determined by the off-state of a starter switch or whether or not the engine speed is more than a predetermined one. The ECU 8 also sets a target generated voltage for a generator 3, and controls the generated output of the generator 3 by using a signal P. At the same time, the ECU 8 determines the correction of the rotation speed of the internal combustion engine, and controls the engine speed by using a rotation correction device 10. By operating a change-over switch 42 via a signal Q in accordance with the target generated voltage, the generated output can be supplied to an on-board battery or the EHC system 43. Here, the temperature of the EHC system 43 is detected by a temperature sensor 44. When the detected temperature reaches a certain predetermined temperature, the determination of the target generated voltage and the determination of the rotational speed correction are performed.

Figure 2A:
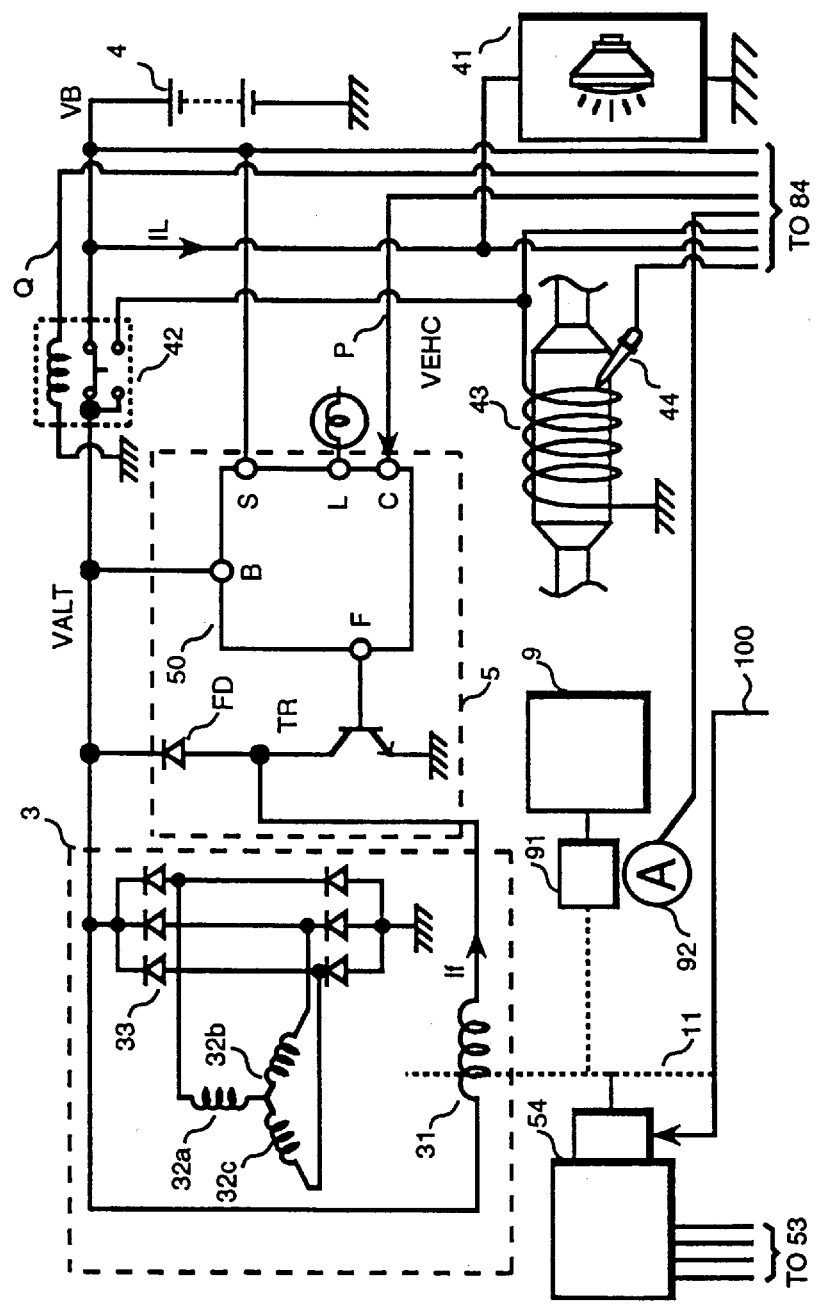
FIGS. 2A and 2B are block diagrams of the entire construction of the power source system according to the present invention.
Figure 2B:
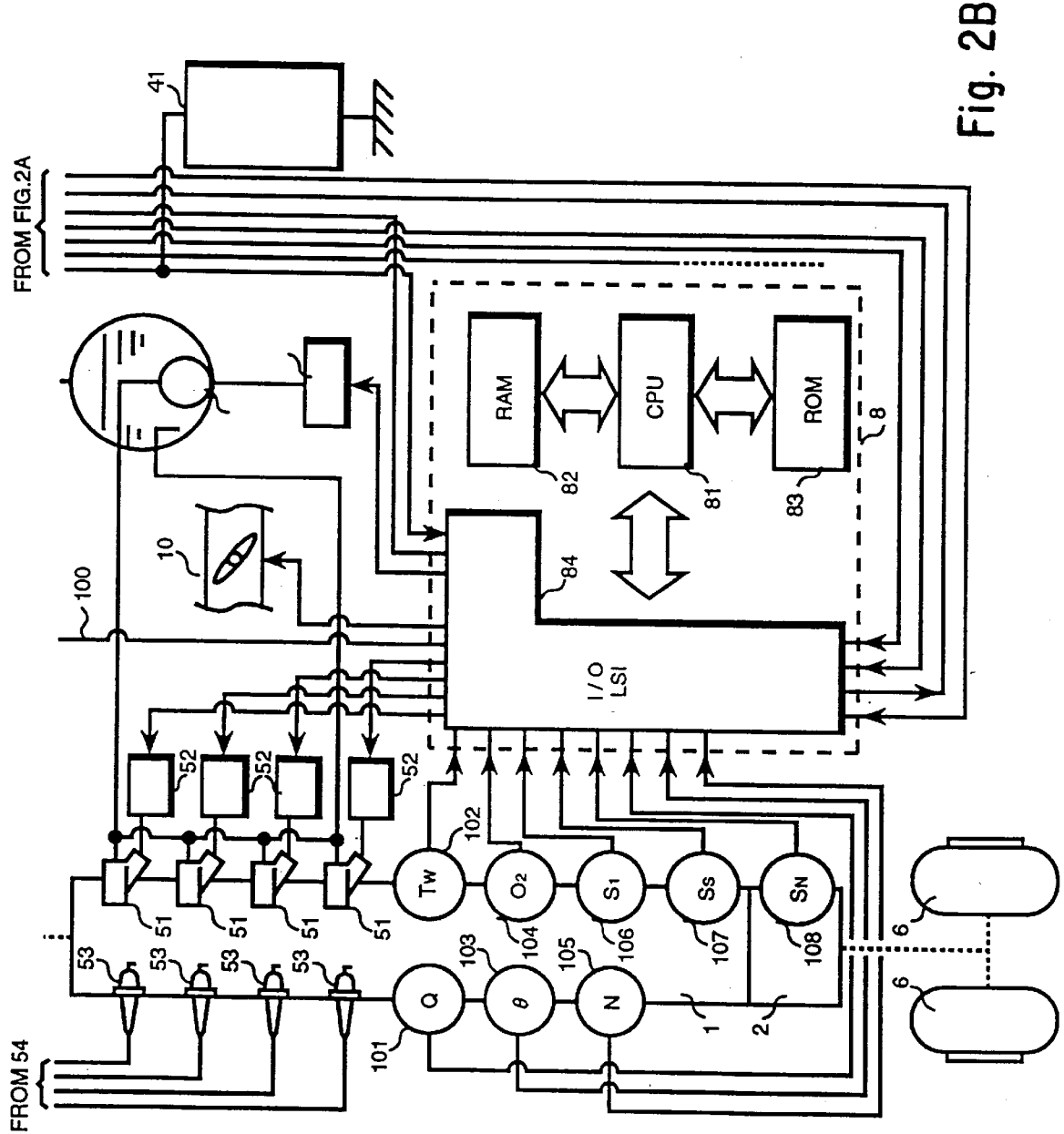

FIGS. 2A and 2B are block diagrams of the entire construction of the power source system according to the present invention. FIG. 2A shows the upper portion of the power source system and FIG. 2B the lower portion. An internal combustion engine 1 on board a vehicle, such as an automobile, includes a power shaft or crank shaft 11 for transmitting a rotating torque. The crank shaft 11 is connected mechanically through a pulley or a belt to the generator 3. The generator 3 is provided with a rotor whose outer periphery is wound by a field winding 31 as in the prior art generator, and a stator in which three-phase windings 32a, 32b and 32c are wound as opposed to the outer periphery of the rotor. The rotor is rotated in synchronization with the crank shaft 11 of the internal combustion engine 1. The three-phase windings 32a, 32b and 32c are connected to a rectifier circuit 33 in which six diodes are connected in series and in parallel, in order to charge the on-board battery 4 by using a direct current obtained by rectifying the three-phase alternating current from the generator 3. The generator 3 is provided with generation control equipment 5 for regulating an output voltage while detecting the voltage of the on-board battery 4. In addition, the present invention includes an EHC system 43 for heating the exhaust gas emitted from the internal combustion engine 1, and a change-over switch 42 for switching the generated output to the on-board battery 4 or the EHC system 43. In one embodiment of the present invention, a mechanical type change-over switch is used for the switch 42 and a temperature sensor 44 is used to detect the temperature of the EHC system 43. The operation of the switch is controlled by the ECU 8.

As is known well, the rotating torque of the internal combustion engine 1 is transmitted through a transmission 2 to driving wheels 6. In one embodiment shown in FIG. 2, the internal combustion engine 1 is a four-cylinder engine of the multiple-cylinder fuel injection (MPI) type, and includes four injectors 51 and their drivers 52, which control the amount of fuel supplied. The internal combustion engine 1 also includes ignition plugs 53 mounted on cylinders respectively. These ignition plugs 53 produce spark by using high voltage for ignition distributed in the order of the ignition cylinders from a distributer 54 which incorporates the ignition plugs, and ignites the fuel compressed in the cylinders. The operation of the injectors 51 and the ignition plugs 53 are controlled by the ECU 8. Further, a fuel pump 71 for pressurizing the fuel and supplying the pressurized fuel to the injectors 51, is provided in a fuel tank 7 as shown in FIG. 2. The operation of the fuel pump 71 is also controlled by the ECU 8 through a fuel pump control unit 72.

The ECU 8, which controls the internal combustion engine 1 is, for example, a microcomputer. The ECU 8 includes a central processing unit (CPU) 81 for performing arithmetic processing to a variety of controls, a random access memory (RAM) 82 for storing temporarily a variety of data used for the arithmetic processing, and a read only memory (ROM) 83 for storing programs and data required for the arithmetic processing. Further, there is provided an input/output large-scale integrated circuit (I/O LSI) 84. The I/O LSI 84 is used to input a variety of parameters and data required to control the internal combustion engine 1 to the microcomputer. The I/O LSI 84 includes an A/D converter to convert an analog signal, for example, battery voltage VB into a digital signal. The I/O LSI 84 also produces a control signal to drive and control a variety of actuators on the basis of the result of calculations by the microcomputer 81.

In order to detect the data and parameters of the internal combustion engine 1 which are required for control by the ECU 8, there are provided an air flow sensor 101 of the hot wire type for detecting an intake air amount Q supplied into the internal combustion engine 1, a water temperature sensor 102 for detecting the temperature TW of cooling water, a throttle sensor 103 for detecting the opening θ of a throttle valve, an $O_2$ sensor 104 for controlling an air to flow ratio (A/F) of supplied fuel by detecting the concentration of oxygen in the exhaust gas, a crank angle sensor 105 for producing the output n of pulses every predetermined rotating angle (for example, 1 degree) of the crank shaft 11 in order to detect the rotating angle or engine speed of the internal combustion engine, an idle switch 106 for detecting an idle state $S_I$ of the engine by using a pressing angle of an accelerator pedal or an angle of the throttle valve, a starter switch 107 for detecting the start $S_S$ of the starter which starts the engine, and an idle speed control (ISC) valve 10 for controlling the engine speed so as to be at a constant speed during the idle state $S_I$ detected by the idle switch 106. Further, the transmission 2 has a neutral switch 108 for detecting whether or not the transmission is in a neutral state $S_N$.

In addition to the variety of parameters and data from the internal combustion engine, the ECU 8 inputs the battery voltage VB of the on-board battery 4, a terminal voltage VEHC of the EHC system 43 and an output signal of the temperature sensor 44. Further, in order to determine the operation of an air conditioner, the ECU 8 inputs an output signal A of a load switch 92 of the air conditioner for the operation of an electro magnetic switch 91 which interrupts the connection between a compressor 9 of the air conditioner and the crank shaft 11.

The generation control equipment 5 controls a field current If and thus the operation of the generation of the generator 3 by detecting an output voltage VB of the on-board battery 4 and comparing it with the predetermined reference value. As is known well, the ECU 8 performs the predetermined processing, and controls various actuators on the basis of the result of processing and thus the operation of the internal combustion engine, by inputting operating parameters of the internal combustion engine which are output from the sensors, the switches, etc.

According to the present invention, the ECU 8 controls not only the operation of the internal combustion engine, but also the operation of the generation of the generator 3. That is, the control signal P output from the I/O LSI 84 of the ECU 8 is input to a control circuit 50.

Figure 3:
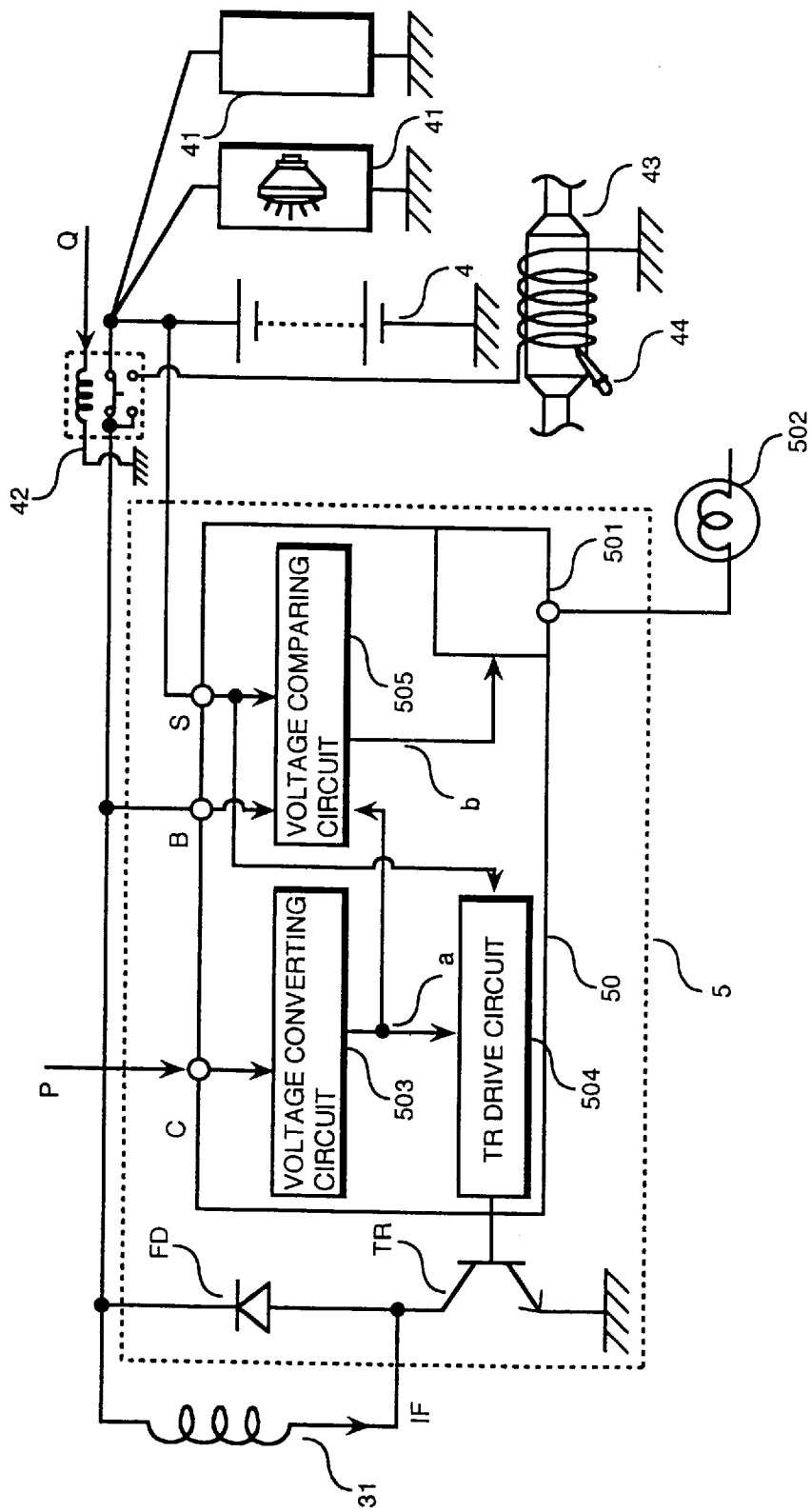
FIG. 3 is a schematic diagram illustrating the function of a generator.

With reference to FIG. 3, the control circuit 50 will be explained hereinafter, FIG. 3 shows the control circuit 50 of the generator 3. The control circuit 50 includes a TR drive circuit 504 as a main control loop. Here, the TR drive circuit 504 is a prior art control circuit of the generator. When a control signal P is input to a terminal C, a voltage converting circuit 503 outputs a signal "a" to a TR drive circuit 504. The TR drive circuit 504 is controlled by the signal "a". In case that a signal is not input from the terminal C, the TR drive circuit 504 controls the generated voltage of the generator to be at a constant voltage as is known in the prior art by using the voltage input to a terminal S. This control circuit 50 includes an alarm circuit 501 which drives an alarm lamp 502 through a terminal L. Since, in the present invention, the output of the generator 3 is supplied to the on-board battery 4 or the EHC system 43, it is required to provide voltages of both 14 volts and 30 volts. Therefore, the present invention has a voltage comparing circuit 505, in order to allow the alarm circuit 501 to operate correctly.

Next, the operation of the voltage converting circuit 503 will be explained with reference to FIGS. 4 and 5. FIG. 4 is a schematic diagram showing the construction of the voltage converting circuit 503. In FIG. 4, reference numeral 503*a* designates a NOT gate, 503*b* and 503*c* analog switches constructed by C-MOS transfer gate, 503*d* and 503*f* resistors, and 503*e* and 503*g* secondary filters which include capacitors. If the input signal P is at a high level, then the analog switch 503*c* turns on and the analog switch 503*b* turns off. As a result, the signal "b" becomes set at a reference voltage VO (ex. 2.4 V). If the input signal P is at a low level, then the signal "b" becomes grounded. If the input signal P takes alternately the high level and the low level, then the signal "b" takes alternately the reference voltage VO (ex. 2.4 V) and 0 V. By passing the signal "b" through the secondary filter, the output signal "a" can be obtained. Therefore, as shown in FIG. 5, by passing the control signal P with cyclic period t (ex. 6.4 ms) through the voltage converting circuit 503, the signal "a" of FIG. 5 is obtained. In FIG. 5, the control signal P is a duty signal with a constant cyclic period.

Figure 6:
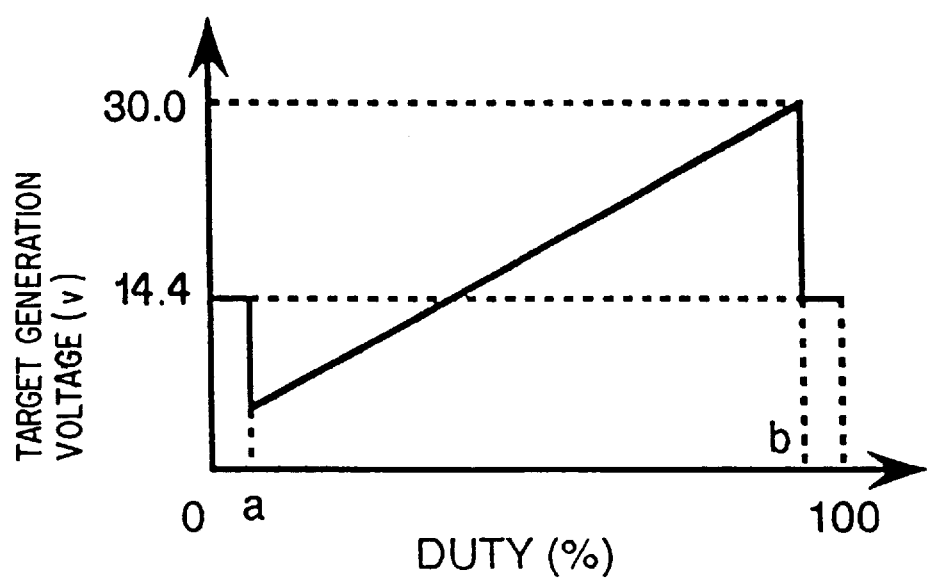
FIG. 6 is a graph showing the relationship between a control signal and a target generated voltage.

FIG. 6 is a graph showing the relationship between the duty of the control signal P processed by the ECU 8 and a target generated voltage of the generator. In FIG. 6, the region in which the lower limit value is "a" and the upper limit value is "b", is defined as an effective region of control. If the duty of the control signal falls within the effective range, then it is possible to obtain the target generated voltage shown in FIG. 6. The probability (DUTY) of the passage of the control signal P is proportional to the target generated voltage. Further, in order to prevent an unstable operation caused by the mixing noise of signals, it is required to provide also the passage probability outside the effective range.

Figure 7:
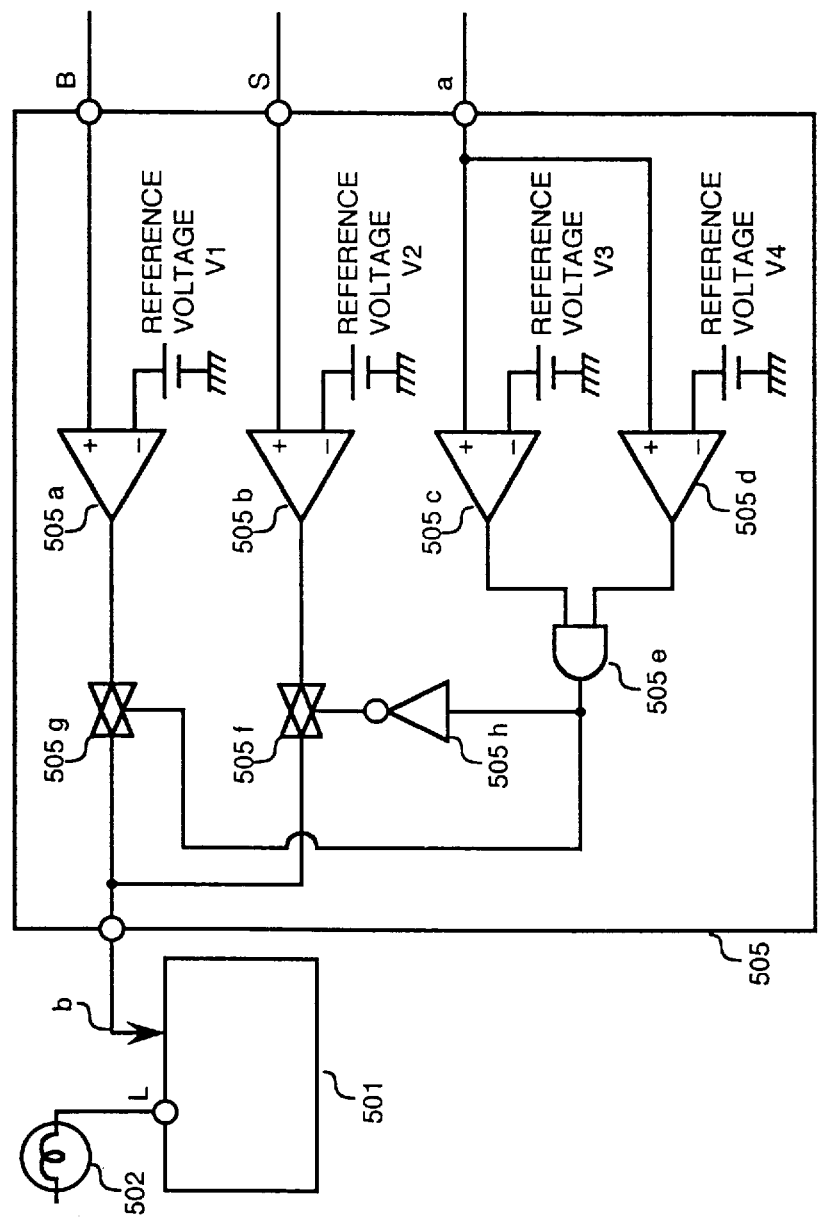
FIG. 7 is a schematic diagram of a voltage comparing circuit.

FIG. 7 shows the voltage comparing circuit 505 which prevents a malfunction of the overvoltage alarm circuit. In FIG. 7, the voltage comparing circuit 505 comprises voltage comparators 505*a*, 505*b*, 505*c* and 505*d* having reference voltages V1, V2, V3 and V4, respectively, an AND gate 505*e*, analog switches 505*g* and 505*f* each including C-MOS transfer gates, and a NOT gate 505*h*. The reference voltage V1 of the voltage comparator is set such that it provides a high level output when the voltage of a terminal B reaches more than 32 volts, and it provides a low level output when the voltage is less than 32 volts. In a similar way, the reference voltage V2 of the voltage comparator is set such that it provides a high level output when the voltage of a terminal S reaches more than 16 volts, and it provides a low level output when the voltage is less than 16 volts. The output of the voltage comparators 505*a* and 505*b* are input to the analog switches 505*g* and 505*h*. The output of the AND gate 505*e* operates these analog switches. When the AND gate 505*e* is at a high level, the analog switch 505*g* turns on and the output of the voltage comparator 505*a* is input to the alarm circuit. The outputs of the voltage comparator 505*c* and 505*d* operate the AND gate 505*e*, and these comparators compare the voltage of the signal "a" with their reference voltages V3 and V4, respectively.

Next, the operation of these voltage comparators will be explained as one example. Assuming that the lower limit value "a" and the upper limit value "b" of the effective range shown in FIG. 6 are 10% and 90%, respectively, the reference voltages are set as follows.

V3=VO×0.9

V4=VO×0.1

If the signal P falls within the effective range of control, then AND gate 505*e* provides a high level output, Otherwise, it provides a low level output. Therefore, it is possible to provide an overvoltage alarm with respect to different voltages.

The operation and the control of the present invention will be explained with reference to FIGS. 8 and 9. First, by turning a key switch of a vehicle on, the ECU 8 starts to control the internal combustion engine 1 (a of FIG. 8). The determination of the start of the internal combustion engine 1 (step 900 of FIG. 9) is performing by detecting the power-on of the starter by a starter switch 107 (b of FIG. 8). After then, it is determined whether a complete fire (full ignition) occurs and whether or not the internal combustion engine 1 normally starts to operate. The determination of the complete fire is performed by checking whether or not the starter switch 107 is at an off-state or whether or not the engine speed is more than the predetermined rotation number or rotation speed. If, as the result of the determination of the complete fire, the starter switch 107 is at an off-state (c of FIG. 8), then the ECU 8 controls the ISC valve 10 by providing it with an amount x of the correction of the rotation number, and holds it for 500 msec as it is (c and d of FIG. 8). As a result, the internal combustion engine 1 becomes stable when starting. In order to drop the control voltage of the generator 3, before operating the change-over switch 42 at a timing shown at "d" of FIG. 8, the ECU 8 outputs the control signal P of the generated voltage to the generator 3 (step 903 of FIG. 9). Where, by setting the voltage of the signal P over the minimum voltage Vmin required to keep the operation of the generation control equipment 5, the passage probability 20% of the signal P can be obtained. It should be noted that if a large current flows through a contact point when the change-over switch 42 is operated, spark occurs and the contact point wears and damages.

Figure 8:
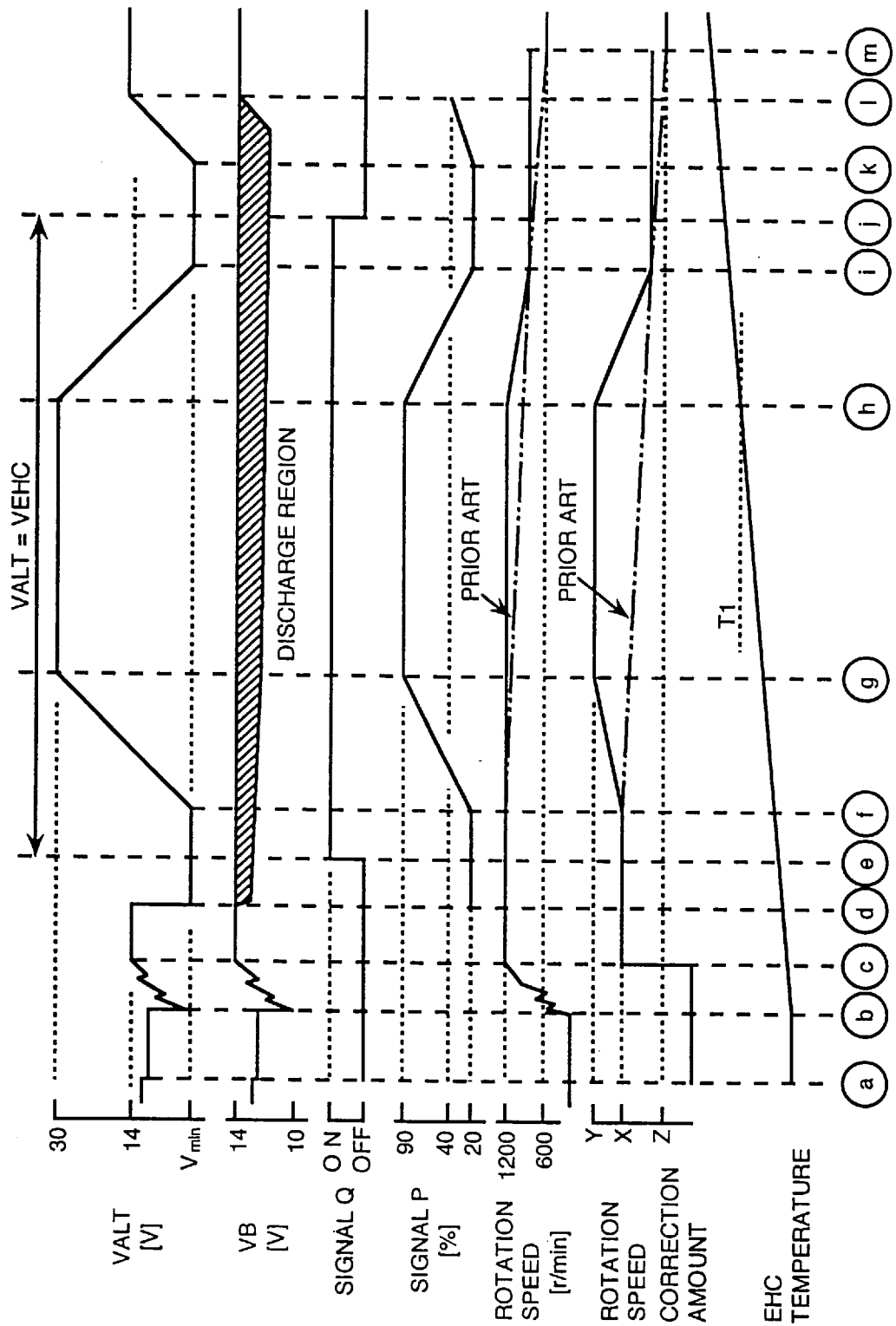
FIG. 8 is a schematic diagram illustrating the operation of the power source system according to the present invention.

After 50 to 100 msec from the time point shown at "d" of FIG. 8 (e of FIG. 8), a signal Q is output (step 904 of FIG. 9) and the change-over switch 42 is operated. At this time, the battery 4 is isolated from the generator 3. However, discharge has already been starting, because an electrical load 41, etc. had been consuming the electric power from the time when the signal P was output (e of FIG. 8). This state is held for 50 to 100 msec after the operation of the change-over switch 42, taking the response of the switch into consideration. After that (f of FIG. 8), the passage probability of the signal P is increased, for example, in the proportions of 3% / 10 msec (step 905 of FIG. 9) At the same time, the applied voltage VEHC of the EHC system is detected (step 906 of FIG. 9) and the increase of the passage probability of the signal P is monitored. Because the generated output is increased as described above, a load torque to the internal combustion engine 1 may be increased, and thus the engine speed can not fall within 1200 rpm in some cases (step 907 of FIG. 9) . Therefore, the present invention further includes the control in which the amount ⊖ of the increasement is added to the amount x of the correction of the rotation number (step 908 of FIG. 9). The control of the correction of the rotation number will be supplemented hereinafter.

In the prior art, the control is performed by using the engine cooling water. Therefore, the amount of the correction follows the two-dotted lines shown in FIG. 8. In the present invention, the increased amount ⊖ is determined by using the amount of the correction predetermined in consideration of the amount of the increase of the signal P. It should be noted that if the increase amount of the signal P is changed, then the amount a is also changed, and that it is required to consider the response of the ISC valve 10 due to the increased amount ⊖.

Figure 9:
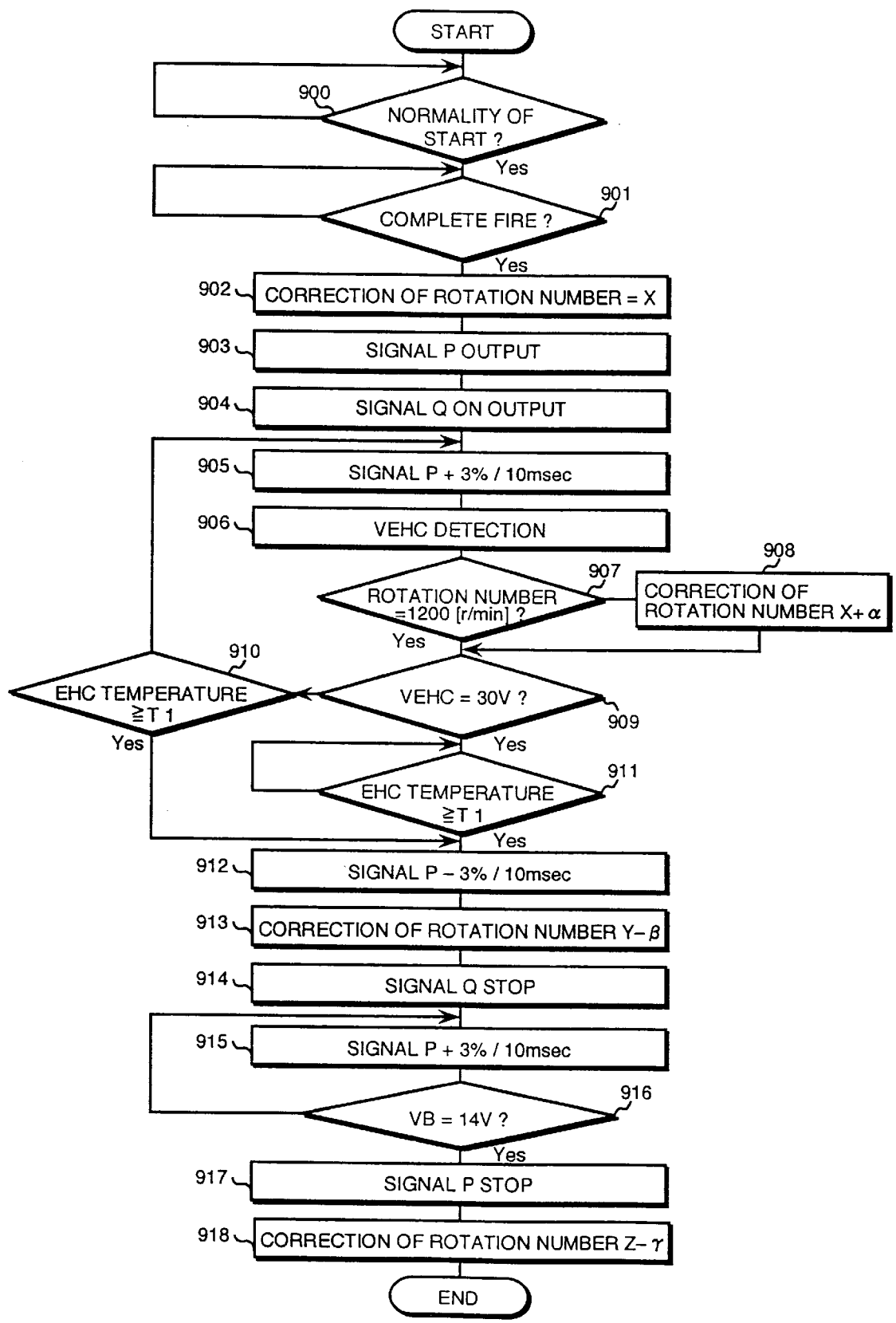
FIG. 9 is a flow chart illustrating the control of the system according to the present invention.

The correction control of the rotation number and the increase of the passage probability of the signal P are performed repeatedly (g of FIG. 8), until the detected voltage VEHC of the EHC system reaches, for example, 30 volts (step 909 of FIG. 9). Further, the above state is held (h of FIG. 8) until the detected value T1 of a temperature sensor 44 for detecting the temperature of the EHC system 43 reaches more than 400° C. (step 911 of FIG. 9). However, the detected value T1 can reach more than 400° C. before the applied voltage reaches 30 volts in some cases (step 910 of FIG. 9). When the temperature of the temperature sensor 44 goes up to the temperature at which the exhaust gas is decreased, the passage probability of the signal P is decreased in the proportions of 3% / 10 msec (step 912 of FIG. 9). Therefore, it is not required to bring the rotation number into the stable state, because the generated output of the generator 3 is decreased.

Accordingly, If the amount of the correction of the rotation number is "y" when the applied voltage VEHC is 30 volts, the correction amount "y" is decreased by β at the same time when the passage probability starts to be decreased (step 913 of FIG. 9). It should be noted that if the decreased amount of the signal P is changed as is the case when the passage probability increases as mentioned before, then the decreased part β is also changed and the response of the ISC valve 10 is considered.

When the passage probability of the signal P becomes 20% as in the case of the previous time (i of FIG. 8), the passage probability of the signal P can be kept. In the conventional control of the rotation speed, the rotation speed continues to decrease up to the predetermined value. In the present invention, it can be held at the rotation speed which is 100 rpm more than the idle speed. After keeping this state for 50 to 100 msec, the change-over switch 42 is returned to its original state by passing a signal Q through an electro-magnetic coil of the switch 42, and thus the generated output of the generator 3 is again supplied to the on-board battery 4. While the output of the generator 3 is connected to the on-board battery, the discharge continues because the generated voltage of the generator 3 is a minimum voltage Vmin. This state is kept for about 50 to 100 msec, taking the response of the switch into consideration (k of FIG. 8).

If the supply of the signal P is stopped, the on-board battery 4 is charged rapidly by the generator 3. As a result, the torque of the generator 3 varies suddenly and, thus, the internal combustion engine 1 may produce trouble. Therefore, in the present invention, the passage probability of the signal P is increased in the proportional of 3% / 10 msec from the passage probability of 20% (step 915 of FIG. 9). By increasing the passage probability of the signal P until the voltage VB of the on-board battery reaches 14 volts while detecting the voltage VB (step 916 of FIG. 9), the supply of the signal P is stopped (step 917 of FIG. 9). After that, the previously increased rotation speed is maintained for the predetermined period of time and returned to the normal rotation speed, for example, 600 rpm (m of FIG. 8). After that, control is performed as in the case of the prior art. Because the generation control circuit 5 for the generator 3 incorporates the relationship between the target voltage and the passage probability of the signal P as shown in FIG. 6, it is possible to improve the fuel consumption by determining the condition of the operation, and controlling the control voltage of the generator 3 by the control equipment 5.

In the embodiment described above, the current supply to the EHC system 43 has been moderated when the temperature of the EHC system 43 reaches more than 400° C. It should be appreciated that the power to the EHC system 43 can be supplied only for 30 sec from the point in time when the power-on of the switch of the starter is detected. If the power supply to the EHC system 43 and the power supply to the on-board battery is stopped, as in the case of the prior art when the engine speed reaches more than 3000 rpm during the power supply to the EHC system 43, it becomes possible to get much safer as a vehicle.

Figure 10:
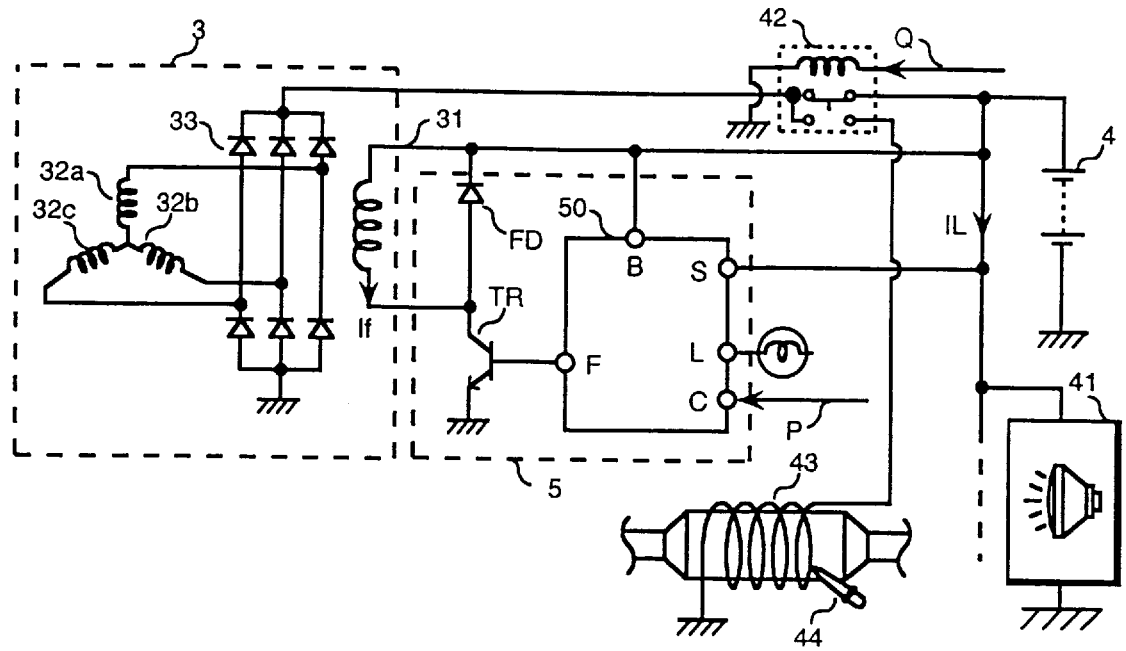
FIG. 10 is a schematic diagram showing the construction of a generator in another embodiment of the present invention.

Another example of the generator 3 which forms a power source system for a vehicle according to the present invention will be explained hereinafter, with reference to FIG. 10. In the conventional generator, the field winding 31 and the generation control equipment 5 are connected to an output terminal of the generator 3 as shown in FIG. 2. Therefore, they are influenced by the generated voltage of the generator 3. In a case where the power supply from the generator 3 is changed over, a surge voltage may occur to the generator. Therefore, the drive unit TR which controls the field current which flows to the field winding 31 and/or the generation control equipment 5 may cause damages. It is possible to prevent these damages by connecting the field winding 31 and the generation control equipment 5 to the on-board battery 4 as shown in FIG. 10.

Figure 11:
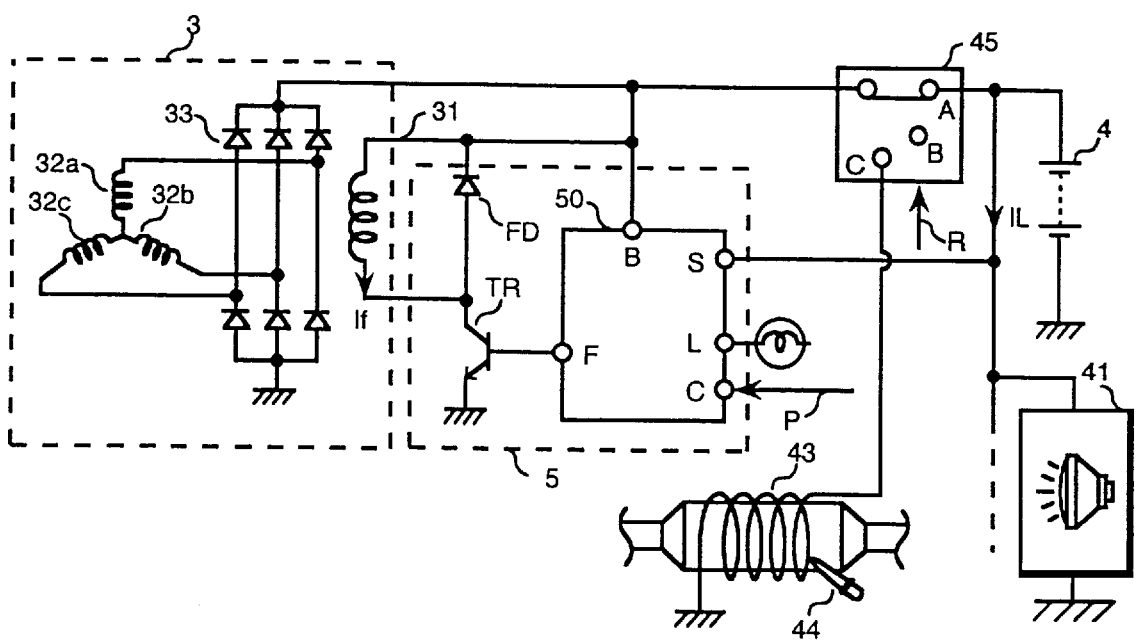
FIG. 11 is a schematic diagram showing the construction of a change-over switch in another embodiment of the present invention.

Another example of a change-over switch 42 which forms a power source system for a vehicle according to the present invention will be explained hereinafter, with reference to FIG. 11. While the generated voltage of the generator 3 is decreased in the present invention in order to prevent the damage of the contact of the change-over switch 42, it is more desirable to decrease the generated voltage to 0 volts if the damages of the contact are taken into consideration. In a change-over switch 45 shown in FIG. 11, the change-over switch 45 is connected to a contact A when the generated output of the generator 3 is supplied to the on-board battery 4, and it is connected to a contact C when the generated output of the generator 3 is supplied to the EHC system 43. It should be noted that a contact B is at a neutral position between the contacts A and C. It is possible to prevent the surge voltage from flowing to the contact to be changed over.

Figure 12A:
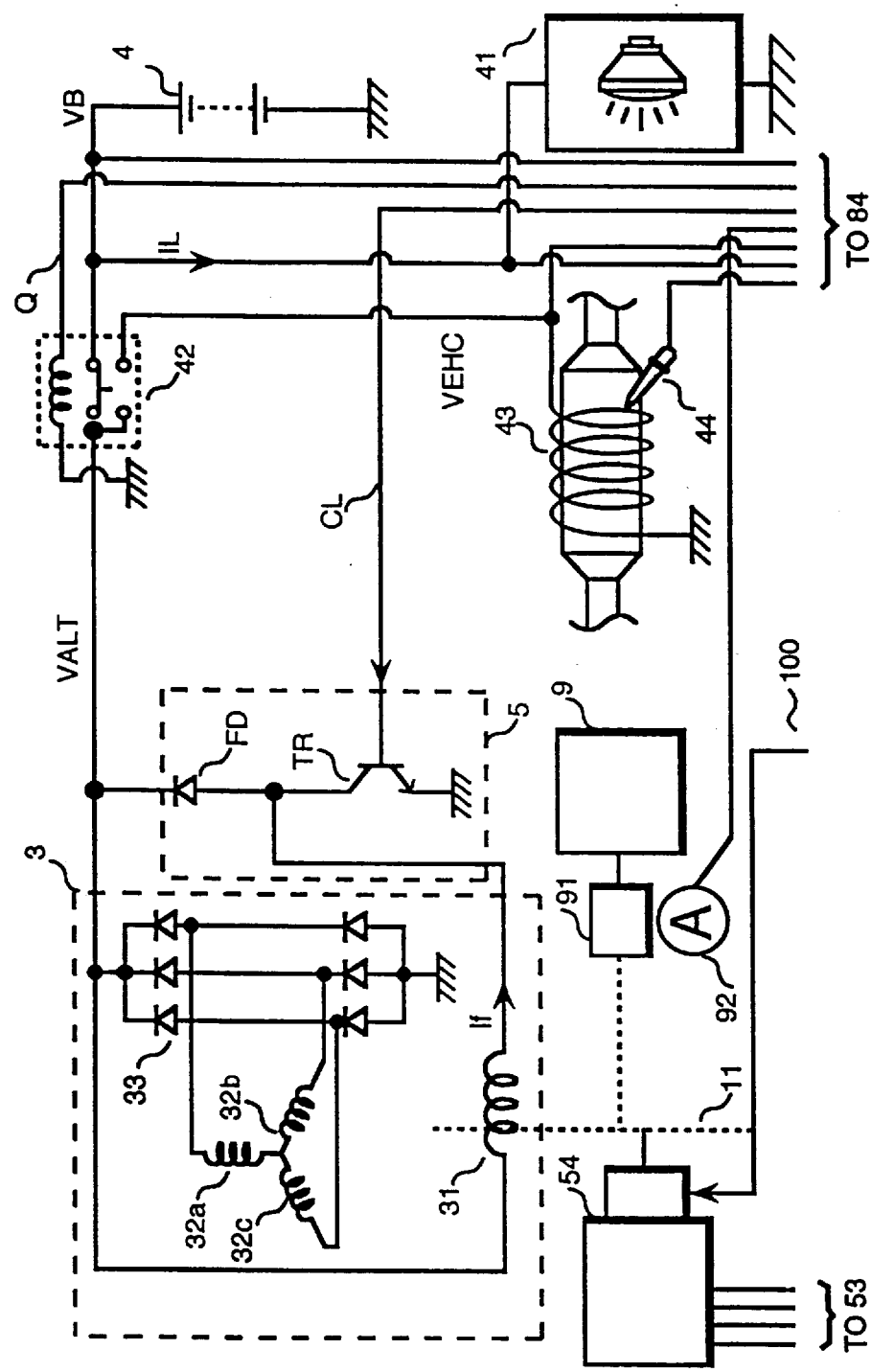
FIGS. 12A and 12B are block diagrams of the system according to another embodiment of the present invention.
Figure 12B:
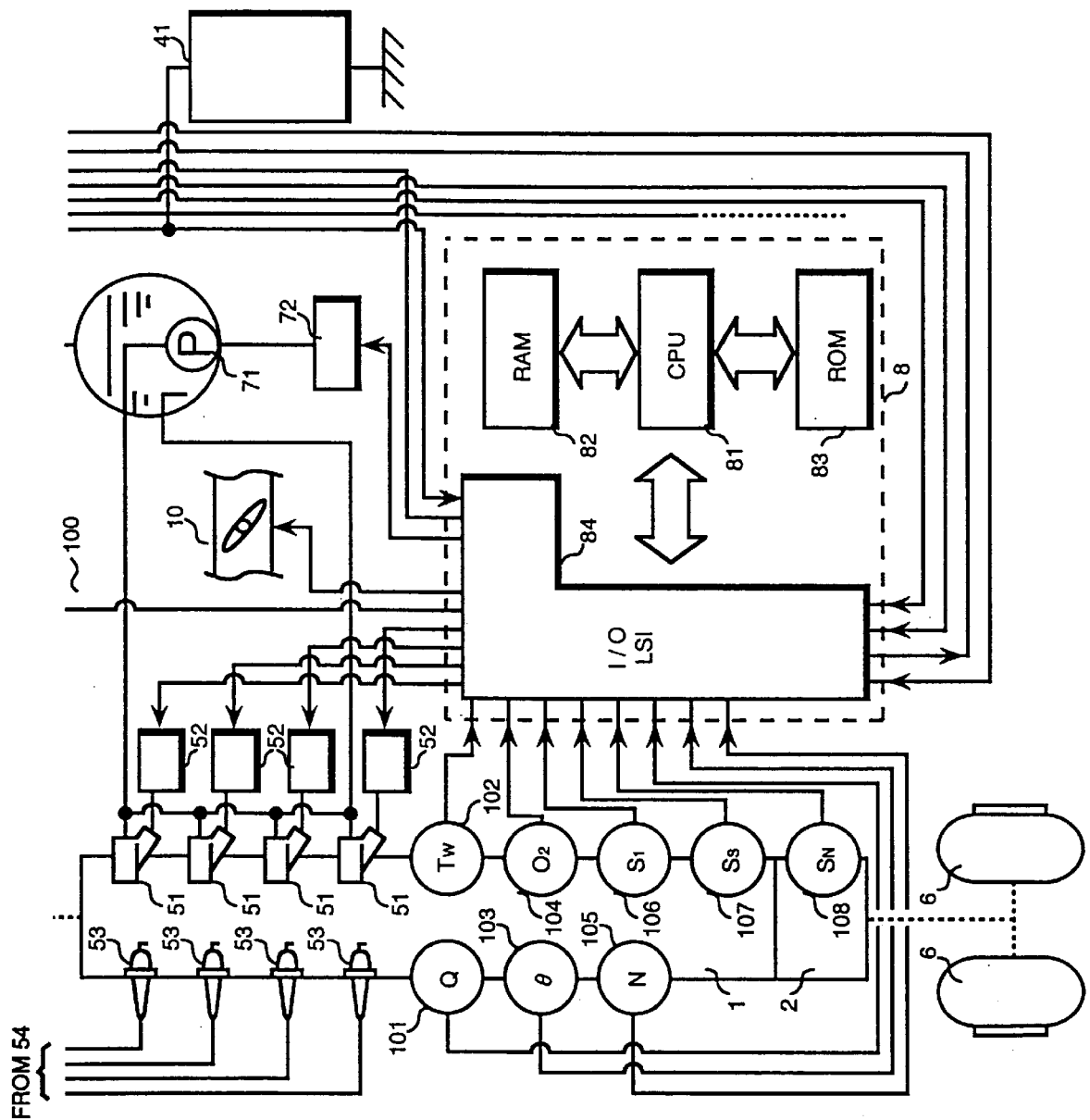

Another embodiment of the power source system for a vehicle according to the present invention will be explained with reference to FIGS. 12A and 12B. In the system shown in FIGS. 12A and 12B, the control unit 50 of the generation control equipment 5 is removed from the system shown in FIG. 2 and the generation control circuit consists of a fly wheel diode FD and the drive unit TR. Hence, the control equipment 50 is incorporated in the ECU 8, and the signal CL which controls the drive unit TR is output from the ECU 8. Thereby, the generator 3 can be controlled as in the case of the prior art. Further, the alarm circuit incorporated in the control equipment 50 can also be operated as in the case of the prior art.

It is further understood by those skilled in the art that the foregoing description is a preferred embodiment of the disclosed device and that various changes and modifications may be made in the invention without departing from the spirit and scope thereof.

What is claimed is:

1. A power source system for a vehicle comprising:
   a generator which is driven by an internal combustion engine to generate electric power;
   a battery means which is operable at a first voltage level and is charged with the electric power generated by the generator;
   a heating means for an electrically heated catalyst system which is operable at a second voltage higher than the first voltage level and is heated with the electric power generated by said generator;

a switch means which changes over the connection of said generator from said battery means to said heating means or vice versa;

an engine control unit which generates a control signal P determining output voltages of said generator to be applied to said heating means for the electrically heated catalyst system and a switching signal Q for causing the changing over at said switching means;

power generation control unit which controls the field current of said generator depending on either the voltage of said battery means or the control signal P from said engine control unit and thereby controls the output voltage of said generator; and a temperature detecting means for detecting temperature at the electrically heated catalyst system;

wherein the control signal P is generated when the rotation speed of the internal combustion engine is stabilized after starting the same, the control signal P is consisted of a first portion which causes said generator via said power generation control unit to generate an output of a third voltage level lower than the first voltage level for a determined period, a second portion following the first portion which causes said generator via said power generation control unit to increase the output voltage from the third voltage level to the second voltage level with a predetermined increment, a third portion following the second portion which causes said generator via said power generation control unit to hold the second voltage level until either said temperature detecting means detects that the temperature of the electrically heated catalyst system exceeds a predetermined temperature or until a predetermined time has passed after the generation of control signal P or until the rotation speed of the internal combustion engine exceeds a predetermined rotation speed, a fourth portion following the third portion which causes said generator via said power generation control unit to decrease the output voltage thereof from the second voltage level to the third voltage level with a predetermined decrement, and a fifth portion following the fourth portion which causes said generator via said power generation control unit to hold the output voltage thereof at the third voltage level for a predetermined period, and during the first portion of the control signal P said engine control unit generates the switching signal Q which changes over the connection of said generator from said battery means to said heating means for the electrically heated catalyst system and during the fifth portion of the control signal P said engine control unit generates the switching signal Q which changes over the connection of said generator from said heating means for the electrically heated catalyst system to said battery means.

2. A power source system for a vehicle according to claim 1, wherein the control signal P further includes a six portion following the fifth portion which causes said generator via said power generation control unit to increase the output voltage thereof from the third voltage level to the first voltage level with a predetermined increment.

3. A power source system for a vehicle according to claim 1, wherein during the second portion of the control signal P said engine control unit increases correction amount for a rotation correction means from a first correction amount X to a second correction amount Y with a predetermined increment, during the third portion of the control signal P said engine control unit holds the correction amount for said rotation correction means at the second correction amount Y, and during the fourth portion of the control signal P said engine control unit decreases the correction amount for said rotation correction means from the second correction amount Y with a predetermined decrement.

4. A power source system for a vehicle according to claim 1, wherein said power generation control circuit includes a first alarm indicating an over voltage for the first voltage level and a second alarm indicating an over voltage for the second voltage level, and said first alarm is rendered inoperative when the output voltage of said generator is controlled through the control signal P.

5. A power source system for a vehicle according to claim 1, wherein a part of said power generation control unit is incorporated into said engine control unit and the other part of said power generation control unit is incorporated into said generator.

6. A power source system for a vehicle according to claim 1, wherein the control signal P is a pulse train having a predetermined cycle and variable duties.

* * * * *